United States Patent [19]
Yokouchi

[11] Patent Number: 5,701,217
[45] Date of Patent: Dec. 23, 1997

[54] DISK CHUCKING MECHANISM AND DRIVE PIN STRUCTURE HAVING CHUCKING LEVER MOVABLE IN TWO DEGREES OF FREEDOM

[75] Inventor: Hideya Yokouchi, Nagano-ken, Japan

[73] Assignee: Seiko Epson Corporation, Tokyo, Japan

[21] Appl. No.: 690,940

[22] Filed: Jul. 31, 1996

Related U.S. Application Data

[63] Continuation of Ser. No. 325,937, Oct. 19, 1994, abandoned.

[30] Foreign Application Priority Data

Oct. 20, 1993 [JP] Japan ................... 5-262677

[51] Int. Cl.$^6$ .................................. G11B 17/022
[52] U.S. Cl. ...................... 360/99.05; 360/99.08
[58] Field of Search .................. 360/99.04–99.05, 360/99.08, 99.12; 369/270–271, 290–291

[56] References Cited

U.S. PATENT DOCUMENTS

| | | | |
|---|---|---|---|
| 4,825,314 | 4/1989 | Maekawa et al. | 360/99.08 |
| 4,855,850 | 8/1989 | Nagaoka et al. | 360/99.12 |
| 5,111,446 | 5/1992 | Fujita | 369/291 |
| 5,121,273 | 6/1992 | Slezak . | |
| 5,126,900 | 6/1992 | Munekata | 360/99.12 |
| 5,151,836 | 9/1992 | Ichihara | 360/99.08 |
| 5,303,102 | 4/1994 | Aruga et al. . | |
| 5,303,104 | 4/1994 | Aruga et al. . | |
| 5,311,383 | 5/1994 | Yokouchi . | |
| 5,357,387 | 10/1994 | Kawana | 360/99.05 |

FOREIGN PATENT DOCUMENTS

| | | |
|---|---|---|
| 0 183 529 | 6/1986 | European Pat. Off. . |
| 62-257659 | 11/1987 | Japan . |
| 62-293554 | 12/1987 | Japan . |
| 63-56621 | 11/1988 | Japan . |
| 64-78462 | 3/1989 | Japan . |
| 2-44562 | 2/1990 | Japan . |
| 3-25749 | 2/1991 | Japan . |
| 5-144168 | 6/1993 | Japan . |

*Primary Examiner*—Stuart S. Levy
*Assistant Examiner*—Brian E. Miller
*Attorney, Agent, or Firm*—Oliff & Berridge

[57] ABSTRACT

A chucking lever is configured so that it can move slightly only in the planar direction of the disk hub, without moving in the axial direction of a spindle that engages a central hole of the disk hub. Furthermore, the top surface of the chucking lever drive pin is configured to extend at an oblique angle relative to the planar surface of a hub platform of the disk chucking mechanism.

39 Claims, 14 Drawing Sheets

DISK CHUCKING MECHANISM AND DRIVE PIN STRUCTURE HAVING CHUCKING LEVER MOVABLE IN TWO DEGREES OF FREEDOM

This a Continuation of application Ser. No. 08/325,937 filed Oct. 19, 1994, now abandoned.

BACKGROUND OF THE INVENTION

1. Field of the Invention

The invention relates to the spindle motor chucking structure of a disk drive unit, and in particular disk drive units for use with 3.5 inch floppy disk cartridges.

2. Description of Related Art

As disclosed in published, unexamined Japanese utility model No. 61-52351 and as shown in FIGS. 15, 16, 17, and 18, disk chucking mechanisms have been used in which a chucking lever 8 is fastened at a supporting point 16 to a rotating plate 4, which rotates with a spindle 3. With this structure, a spring 14 provides force in the axial direction of a drive pin 5 of the chucking lever 8, while a spring 15 applies force to drive pin 5 in the rotational direction. FIGS. 15, 16, and 17 respectively show a top view, a cross-section, and a bottom view of this conventional disk chucking mechanism. Portions of disk 1 and disk hub 2 are drawn using broken lines in FIGS. 15 and 16. FIG. 18 is a simplified cross-section of the drive pin area.

When the disk hub 2 is set in position when being chucked, the chucking lever 8, which possesses a structure that rotates about the supporting point 16, will move in the direction of arrow 6, as shown in FIG. 18 and the drive pin 5 will slide along the surface of hub 2, unless the position of the rotation drive hole 2b, which is eccentrically located in the disk hub 2, becomes aligned with the drive pin 5. Next, as shown in FIG. 16, when the rotor 11 of the spindle motor 10, which is provided at the end of the spindle 3, begins rotating, the drive pin 5 rotates with the spindle 3, and the drive pin 5 is pushed by the force of the spring 14 and protrudes into the rotation drive hole 2b when the rotation drive hole 2b and the drive pin 5 become aligned. As shown in FIG. 15, because of its position in relation to the supporting point 16, when the drive pin 5 rotates the disk hub 2, it generates both a force in the direction of arrow 7 and a force to rotate the disk hub 2. Of these two forces, the force in the direction of arrow 7 becomes the force that pushes two points inside the center hole 2b of the disk hub 2 against the spindle 3. In this way, the drive pin 5 drives the rotation of the disk hub 2 while also centering disk hub 2 on spindle 3.

Referring to FIG. 16, a first magnetic head 12, which records signals in and reproduces signals from disk 1, is positioned between the frame 13 of the spindle motor 10 and the disk 1. As is well known, first magnetic head 12 is mounted on a support 17. A second magnetic head 12' is provided on the opposite side of disk 1 relative to the first magnetic head 12. During a data writing or data reading (reproducing) operation, magnetic heads 12 and 12' apply light pressure to the disk 1.

A chucking mechanism in which the drive pin does not change its position (i.e., does not move) in the axial direction of the spindle is disclosed in published unexamined Japanese patent No. 5-144168 and is shown in FIGS. 19, 20, and 21.

FIG. 19 is an oblique view of the chucking mechanism in which a disk hub has been installed. FIG. 20 is a cross-section of the chucking mechanism in the same state as in FIG. 19. FIG. 21 is a cross-section of the chucking mechanism when the drive pin and the disk hub drive hole are not engaged.

In FIG. 19, although the center hole 2b of the disk hub 2 engages with the spindle 3 when the disk hub 2 is set in the chucking mechanism, the probability is low that the rotation drive hole 2b, which is eccentrically located, will engage with the drive pin 5. It is a rare occasion when the disk hub 2 even ends up on top of the perimeter 5a of the drive pin 5, as shown in FIG. 19. However, as shown in FIG. 20, bevelling 5c is provided in the drive pin 5 adjacent to the top surface 5b of drive pin 5. Therefore, as shown in FIG. 21, when the drive pin 5 is located under the disk hub 2, it moves the disk hub 2 slightly in the direction of arrow 20, which disengages the drive pin 5 from the rotation drive hole 2b. The drive pin 5 then slides under the disk hub 2 and again engages with rotation drive hole 2b, resulting in normal chucking.

With the aforementioned conventional technology, it is difficult to produce thin-profile disk drives because the thickness of the drive is determined by the dimensions of the rotor 11 of the spindle motor 10, the first carriage 17, the first magnetic head 12, and the space required by the disk chucking mechanism, etc.

In particular, as shown in FIG. 18, extra space is required because the drive pin 5 is pushed in the axial direction by the disk hub 2, moving in the direction of arrow 6, when the disk hub 2 is being chucked.

Furthermore, with a chucking mechanism in which the drive pin does not change its position in the axial direction, a movement occurs that pushes the disk hub in the direction of arrow 20, as shown in FIG. 21, when the drive pin and the disk hub are incompletely engaged as described above. During this movement, the disk hub is held down by the jacket (not shown in the drawing) that houses both the disk and the disk hub, and a great amount of force is required in order to push the disk hub in the direction of arrow 20 in the drawing. Thus, the use of a spindle motor possessing large torque is required. Insufficient motor torque results in stoppage of the rotation of the spindle motor, resulting in chucking failure.

SUMMARY OF THE INVENTION

It is an object of the invention to reduce the space required by the chucking mechanism, to simplify the disk chucking mechanism while achieving a thinner profile, and to improve the reliability of the chucking mechanism.

In order to achieve the above and other objects, and to address the shortcomings set forth above, embodiments of the invention provide a disk chucking mechanism for rotating a disk having a disk hub with a central hole and a drive hole offset from the central hole. In particular, the disk chucking mechanism includes a rotatable spindle that is insertable into the central hole of the disk hub, and which extends in an axial direction. A rotating member is attached to the spindle for rotation with the spindle. The rotating member extends in a plane substantially perpendicular to the axial direction. A chucking lever of the disk chucking mechanism includes a drive pin having a first end that is insertable into the drive hole of the disk hub. A second end of the drive pin, located opposite from the first end, is engaged with the rotating member. The chucking lever further includes a movement restriction member that restricts (i.e., prevents) movement of the chucking lever in the axial direction so that the chucking lever is not movable in the axial direction. The chucking lever also is engaged with the rotating member so that the chucking lever is prevented from disengaging with the rotating member. The chucking lever is movable by a predetermined amount in the plane of the rotating member, without moving in the axial direction.

Preferably, the chucking lever is arranged so that when the disk chucking mechanism is engaged with a disk to rotate the disk, an acute angle β is formed between a direction in which force is applied to the chucking lever and a line connecting a center of the spindle to a point at which the drive pin contacts the disk hub in a rotational movement direction of the disk.

The drive pin can be configured so that it contacts the drive hole of the disk hub at least at one point while rotating the disk. According to one embodiment, the drive pin contacts the drive hole at two points. According to another embodiment, the drive pin contacts the drive hole at least along one line while rotating the disk. According to one embodiment, the drive pin contacts the drive hole along two lines.

The disk chucking lever is arranged so that when the central hole of the disk hub has not reached a predetermined control (centering) position in relation to the spindle while the drive pin is fully inserted into the drive hole, the chucking lever will rotate in a counter-clockwise direction when viewed from a side of the disk hub that contacts the chucking lever until the central hole of the disk hub reaches the predetermined control position relative to the spindle.

The rotating member can be the rotor of a spindle motor that is coupled to and rotates the spindle. The rotating member alternatively could be a chucking magnet that attracts and holds the disk hub, which usually is metallic. A hub platform having a central aperture can be directly attached to the spindle. A radially inner portion of the chucking magnet can be directly attached to a radially outer surface of the hub platform. The chucking magnet can include a hole between its radially inner and radially outer surfaces, with the chucking lever being located within this hole. The hole can function to limit the movement of the chucking lever in the planar direction (i.e., the direction perpendicular to the axial direction of the spindle).

The disk chucking lever preferably is movable in all directions within the plane of the rotating member as long as a magnitude of such movement is within a range that ensures engagement between the drive hole and the drive pin when the disk hub has been set in the disk chucking mechanism.

According to a further embodiment of the invention, the first side of the drive pin, which is inserted into the disk hub drive hole, includes an engagement surface that extends at an oblique angle relative to the plane of the rotating member so that the disk hub will rest on the oblique surface when the spindle is inserted into the disk hub central hole, while the drive pin is not inserted through the disk hub drive hole. Preferably, a difference in the axial direction between the oblique surface and the hub platform upon which the disk hub rests, is at a minimum at a point on the oblique surface located from a point closest to the spindle to a point located on a drive pin advancement side of the drive pin. Preferably, the point where the difference between the oblique surface and the hub platform is at a minimum is at the point on the oblique surface closest to the spindle.

Preferably, the drive pin extends axially beyond the hub platform by no more than 0.7 mm.

According to another aspect of the invention, a disk chucking mechanism includes a rotatable spindle that is insertable into the central hole of the disk hub, and which extends in an axial direction, a hub platform attached to the spindle for rotation with the spindle, and which extends in a plane substantially perpendicular to the axial direction, and a drive pin having a first end that is insertable into the drive hole of the disk hub. The drive pin includes a movement restriction member that restricts (i.e., prevents) movement of the drive pin in the axial direction so that the pin does not move in the axial direction. The first end of the drive pin has an oblique surface arranged at an oblique angle relative to the plane of the hub platform. An amount by which the drive pin protrudes axially beyond the hub platform is no more than 0.7 mm. Preferably, the oblique angle is approximately equal to a minimum angle formed when a disk hub is placed on the hub platform with the spindle located in the central hole of the disk hub, and with the disk hub resting on the drive pin first end with the drive pin not inserted into the drive hole. Preferably, the oblique angle is within +/–2° of this minimal angle.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

The invention is explained below, with reference to the drawings.

Figure 1:
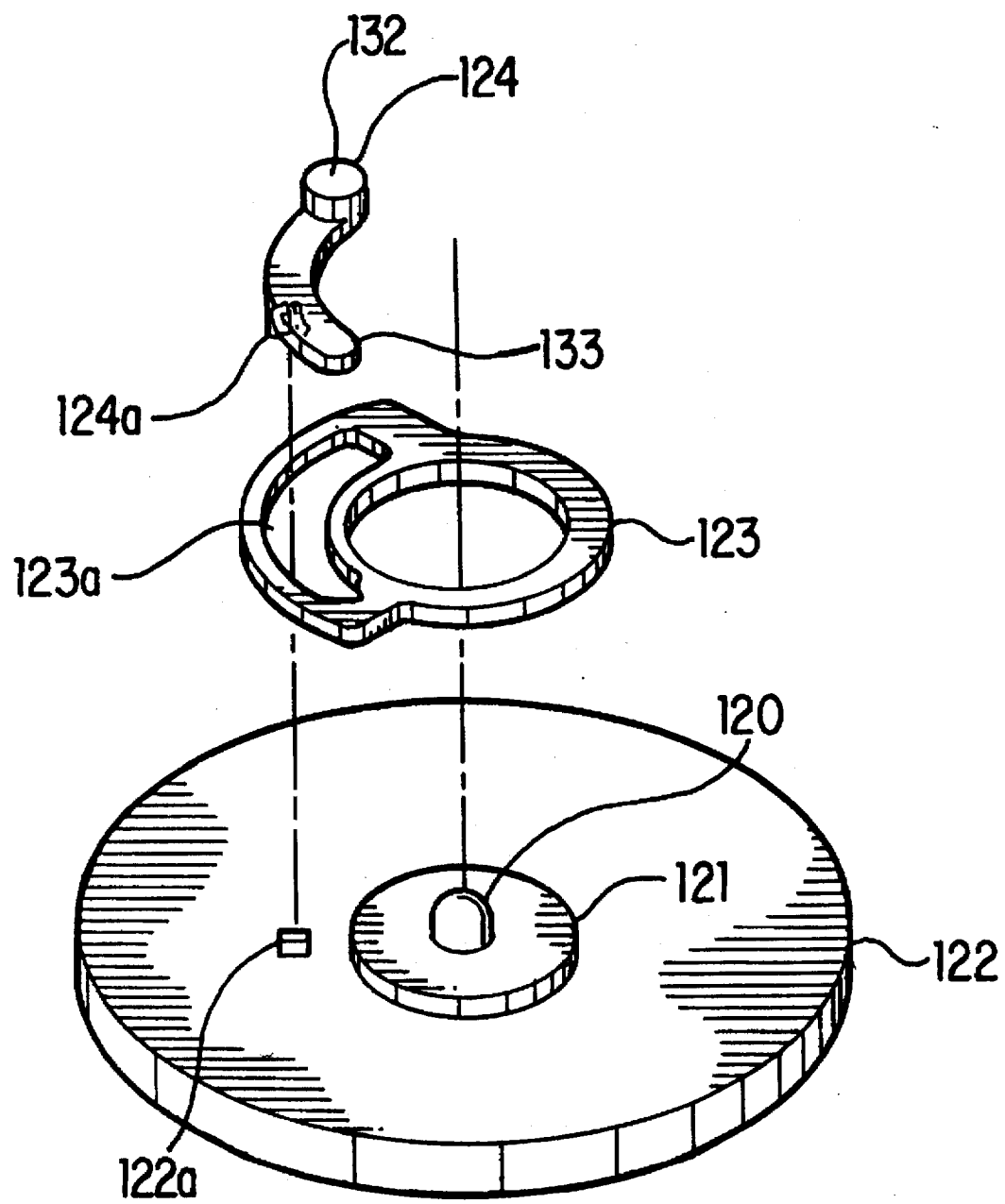
FIG. 1 is an oblique exploded view of an embodiment of a disk chucking mechanism using the spindle motor of the invention.

FIG. 1 is an oblique exploded view of an embodiment of the disk chucking mechanism of the invention. In FIG. 1, the disk chucking mechanism includes a spindle 120, which performs centering by engaging with the central hole of a metallic disk hub (not shown in FIG. 1), which is secured to the center of the disk stored inside a jacket. Platform 121 for receiving the disk hub is fastened to the spindle 120. The rotor 122 of the spindle motor that drives the disk is fastened to the platform 121. Furthermore, a chucking magnet 123 for attracting and holding the disk hub is glued and/or otherwise fastened to the perimeter of the platform 121.

The chucking magnet 123 includes a hole 123a for receiving the chucking lever 124. The chucking lever 124 includes a latching area 124a for engaging with the rotor 122 and also includes a first end 132 and a second end 133. The latching area 124a is engaged in a hole 122a of the rotor 122. With this configuration, the chucking lever 124 can move in the planar direction of the rotor 122, but cannot move in the axial direction of the spindle 120. Preferably, a plastic magnet is used as the chucking magnet 123 in this configuration, in which the hole 123a restricts (i.e., limits) the movement of the chucking lever 124 in the planar direction of the rotor 122 within a specified range. In this embodiment, the chucking magnet 123 limits the movement of the chucking lever in the horizontal (planar) direction, while latching area 124a restricts the movement of the chucking lever in the axial direction.

Figure 2:
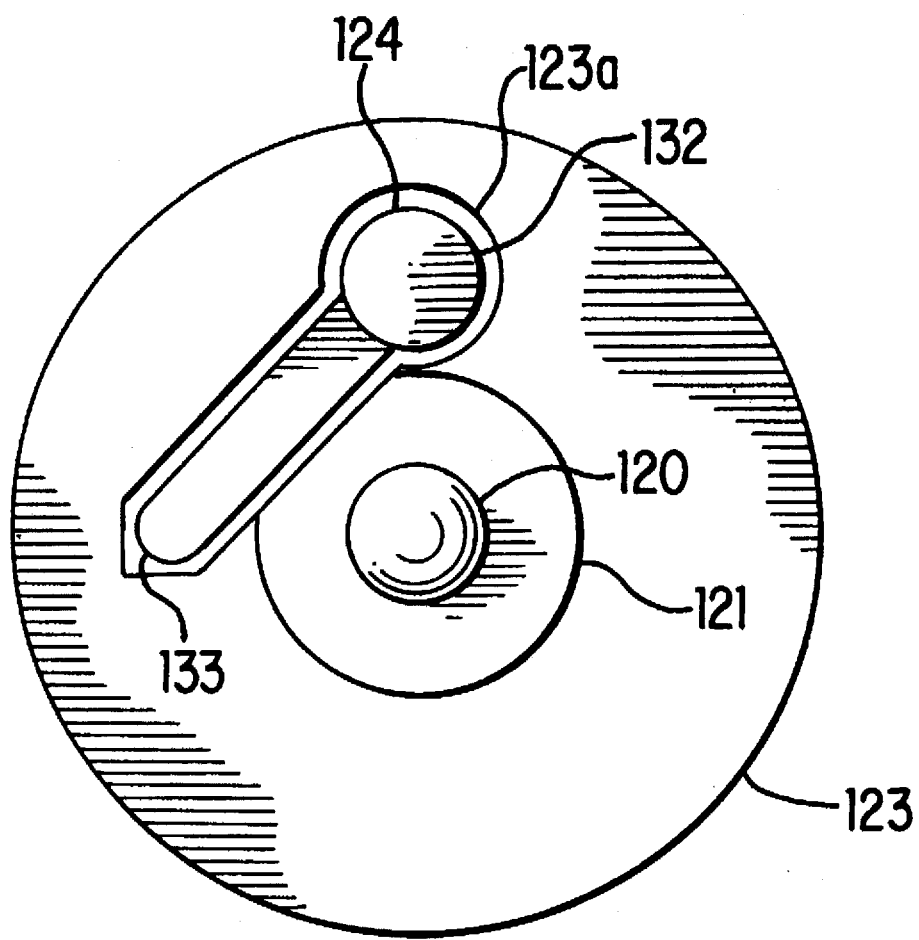
FIG. 2 is a top view of FIG. 1.
Figure 3:
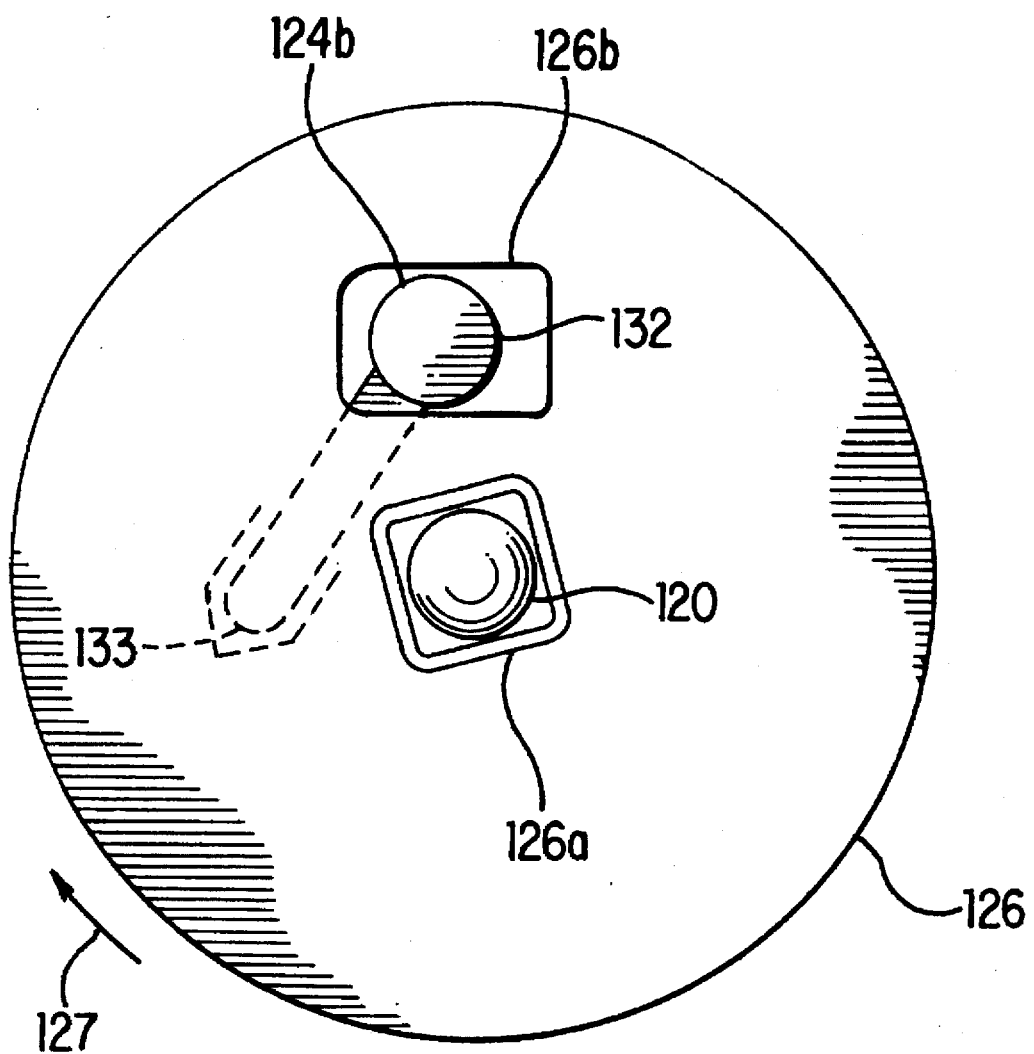
FIG. 3 is a top view of the FIG. 1 chucking mechanism when the disk hub has been mounted.
Figure 4:
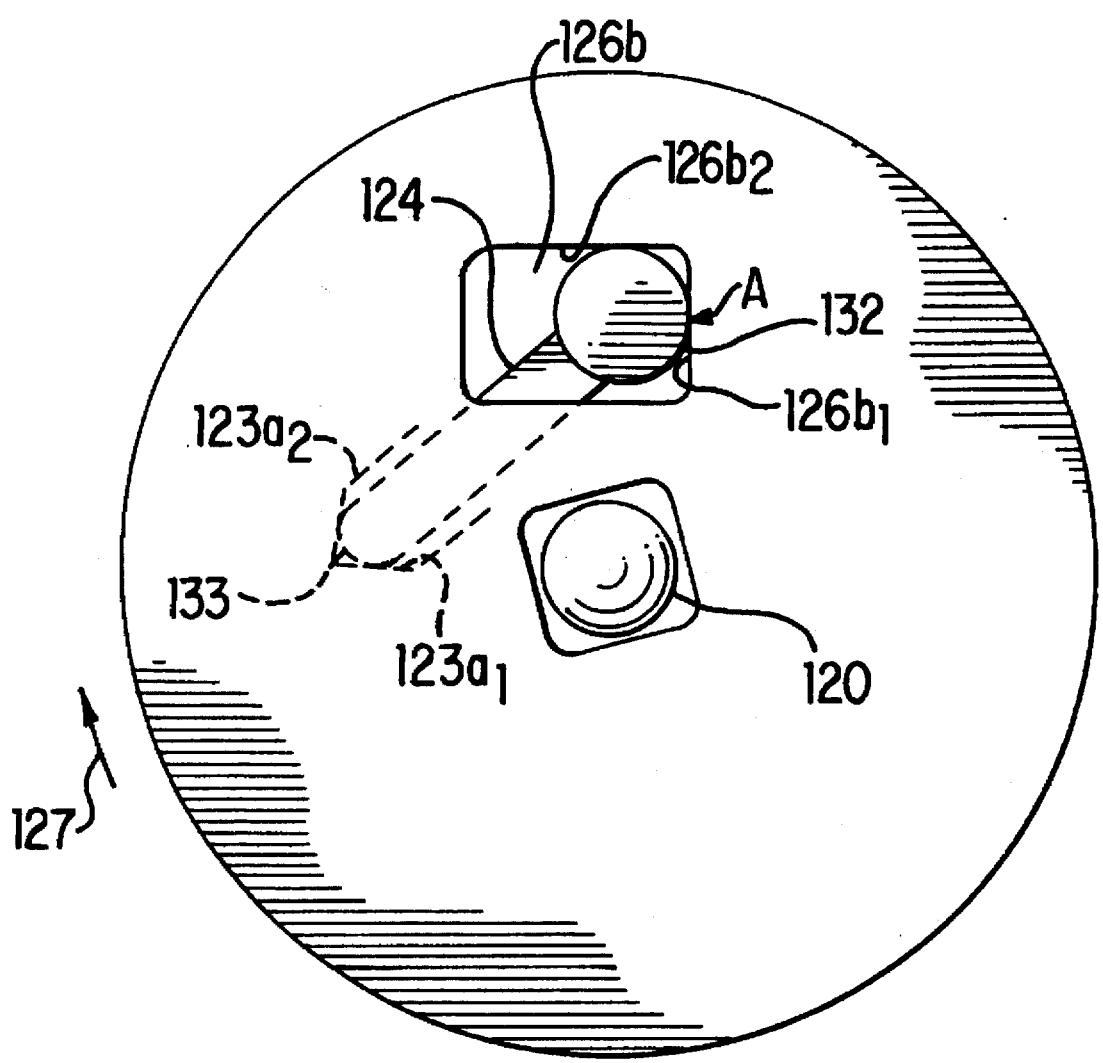
FIG. 4 also is a top view of the FIG. 1 chucking mechanism when the disk hub has been mounted and when the drive pin engages two surfaces of the disk drive hole.
Figure 5:
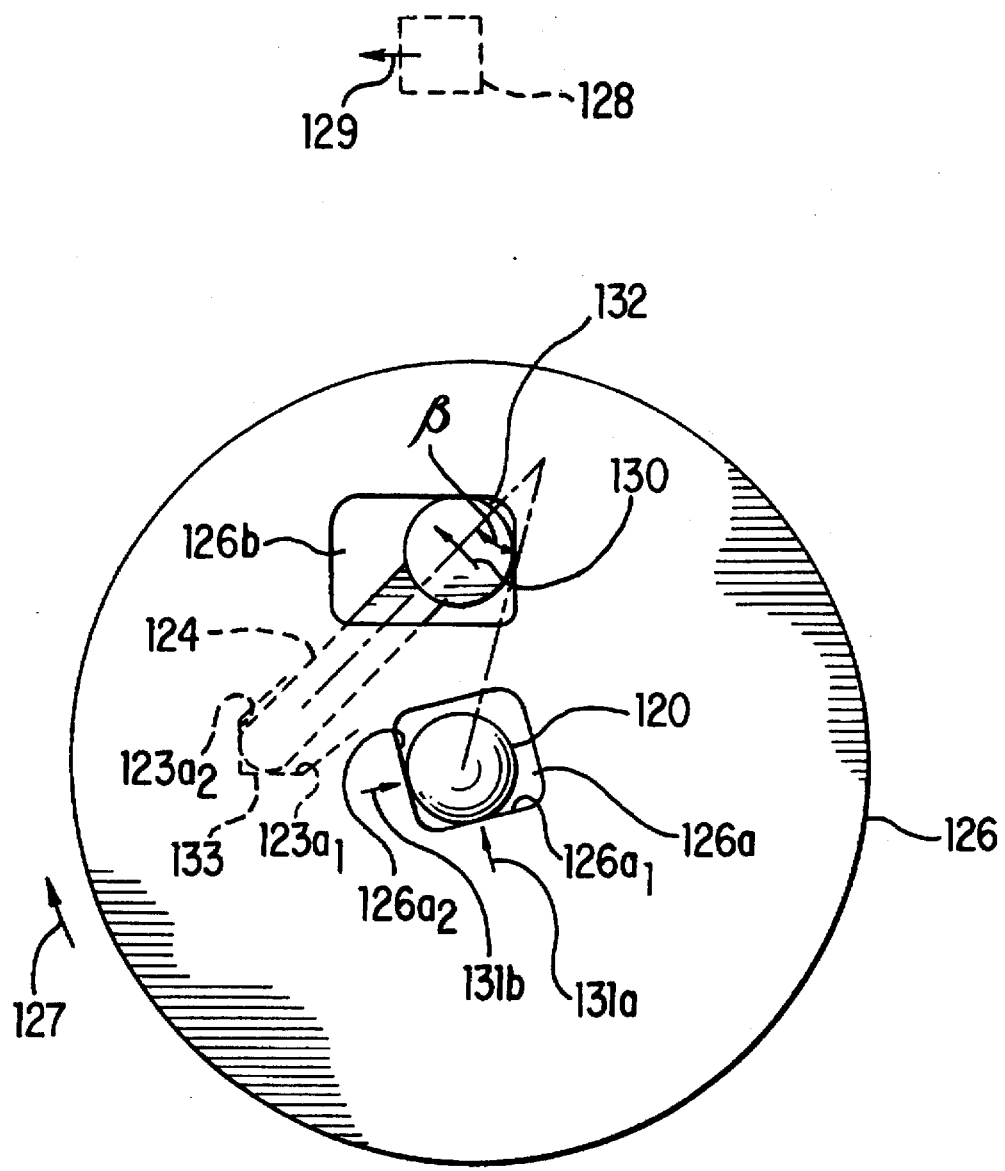
FIG. 5 also is a top view of the FIG. 1 chucking mechanism when the disk hub has been mounted and the disk is centered.

FIG. 2 is a top view of the disk chucking mechanism of the invention and is similar to FIG. 1. FIGS. 3, 4, and 5 also are top views of the disk chucking mechanism of the invention, in which the disk hub has been attracted to and is being held by the disk chucking mechanism in FIG. 2. The embodiment of FIGS. 2–5 differs from the FIG. 1 embodiment in that the chucking lever is straight, rather than being curved. Additionally, a portion of the radially outer surface of the hub platform 121 is flattened.

In FIG. 2, the platform 121 is fastened to the perimeter of the spindle 120, and the chucking magnet 123 is fastened to the perimeter of the platform 121, as was described with regard to FIG. 1.

The chucking magnet 123 includes the hole 123a, and the chucking lever 124 is installed in such a way that it can freely move inside the hole 123a within a specified range in the planar direction of the platform 121.

Figure 6:
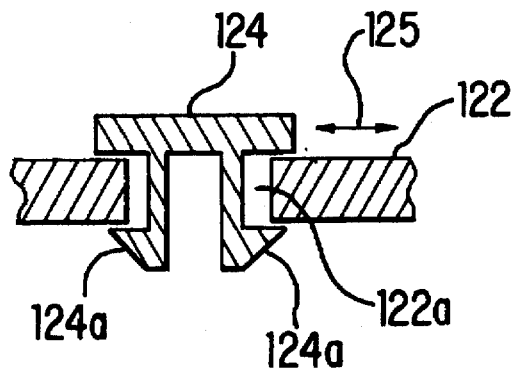
FIG. 6 is a cross-section of the latching area in the FIG. 1 embodiment.

FIG. 6 is a cross-section of the latching area 124a of chucking lever 124. This latching area 124a, which is provided on the chucking lever 124, is inserted into the hole 122a in the rotor 122. The latching area 124a is flared on the bottom side of the rotor 122, such that the chucking lever 124 can move within a specified range in the direction of arrow 125 in FIG. 6, while its movement in the vertical direction (i.e., the axial direction) is restricted. In other words, rather than pivoting in the plane of rotor 122 about a fixed point, the chucking lever and the portion of the chucking lever extending through hole 122a can move in the plane (or float). Of course, the clearance resulting from the thickness tolerance in both the latching area 124a and the rotor 122 will allow insubstantial, slight movement of the chucking lever 124 in the axial direction. However, the design minimizes this movement.

FIG. 3 is a diagram in which the disk hub 126, fastened to the center of the recording medium, is mounted on the chucking mechanism of FIG. 2. When the disk hub 126 is set in the chucking mechanism, the center hole 126a of the disk hub 126 engages with the spindle 120, and the spindle 120 protrudes into the central hole 126a. However, the probability is small that the drive hole 126b, which is eccentrically located from the central hole 126a, will engage with the drive pin 124b of the chucking lever 124. The disk hub 126 will first ride over the drive pin 124b. Note that as the spindle 120 begins rotating, both the chucking magnet 123 provided for the rotor 122 and the chucking lever 124 inside the hole 123a will also begin rotating in the direction of arrow 127 in FIG. 3.

While this rotation is taking place, the disk hub 126 remains stationary even though the spindle 120 rotates, because the disk (a magnetic recording medium, not show in the drawing) mounted on the perimeter of the disk hub 126 is being held by the magnetic head (also not shown in the drawing).

When the drive pin 124b becomes aligned with the drive hole 126b of the disk hub 126, the drive pin 124b protrudes into the drive hole 126b, and reaches the state shown in FIG. 3.

In this state, the centered position of the disk hub 126 has not yet been established. Then, as shown in FIG. 4, as the spindle 120 continues to rotate in the direction of arrow 127, the chucking lever 124 in particular first end 132, comes to be held by surfaces 126b1 and 126b2 of the drive hole 126b of the disk hub 126, and at second end 133 by surfaces 123a1 and 123a2 of hole 123b of the chucking magnet 123.

As shown in FIG. 5, as the spindle 120 attempts to continue rotating in the direction of arrow 127, a frictional load is applied in the direction of arrow 129 in the drawing, on the magnetic head 128 which is grasping the disk. The chucking lever 124 will then rotate around the two surfaces 123a1, 123a2 of hole 123a in the direction of arrow 130 in the drawing (the counter-clock-wise direction), while pushing surfaces 126a1 and 126a2 of the central hole 126a of the disk hub 126 against the spindle 120 in the directions of arrows 131a and 131b, thus completing the positioning of the disk hub 126.

Figure 7:
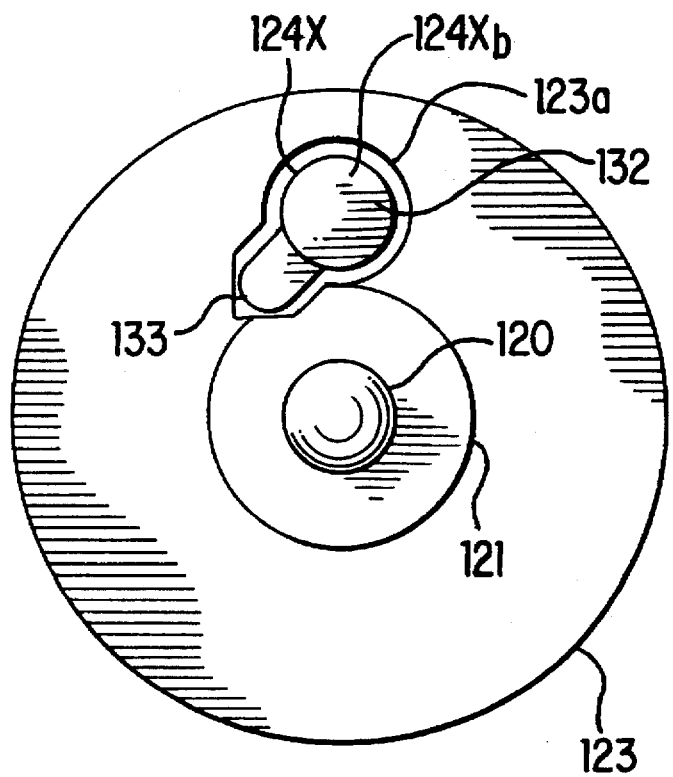
FIG. 7 is a top view of an alternate embodiment disk chucking mechanism of the invention.
Figure 8:
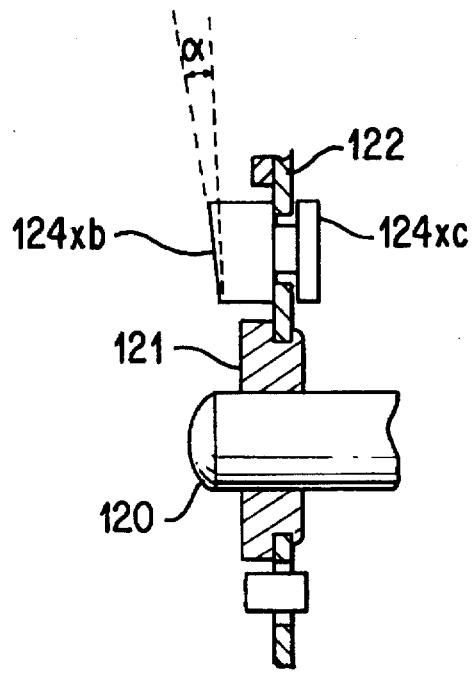
FIG. 8 is a cross-section of the FIG. 7 drive pin area.

FIGS. 7 and 8 show other working examples in accordance with the invention, with FIG. 7 being a top view of a disk chucking mechanism similar to the one shown in FIG. 2. FIG. 8 is a cross-section of the drive pin area in FIG. 7.

In FIG. 7, the platform 121 is fastened to the perimeter of the spindle 120, and the chucking magnet 123 is fastened to the perimeter of the platform 121.

Hole 123a has been provided in the chucking magnet 123, and the chucking lever 124x is installed so that chucking lever 124x can freely move inside the hole 123a within a specified distance in the planar direction of the platform 121. Up to this point, the difference from the mechanism shown in FIG. 2 is that the chucking lever 124x is shorter than the chucking lever 124. However, as shown in FIG. 8, in this working example, the engagement area 124xc has been provided in the lower part of the drive pin 124xb, which functions as an anti-disengagement device to prevent the chucking lever 124x and the rotor 122 from disengaging from each other. The movement of the chucking lever 124x in the axial direction of the spindle 120 is restricted by this engagement area 124xc, while being allowed to move for a specified distance in the planar direction of the rotor 122. Thus, the chucking lever 124x is able to position the media hub 126, as explained in FIGS. 3 through 5. Note that it is possible to make the chucking lever 124x extremely small in this working example.

Thus, unlike the previous embodiments in which the axial movement restriction member was spaced away from the drive pin on the chucking lever, this embodiment provides the axial movement restriction member directly below the drive pin.

Figure 9:
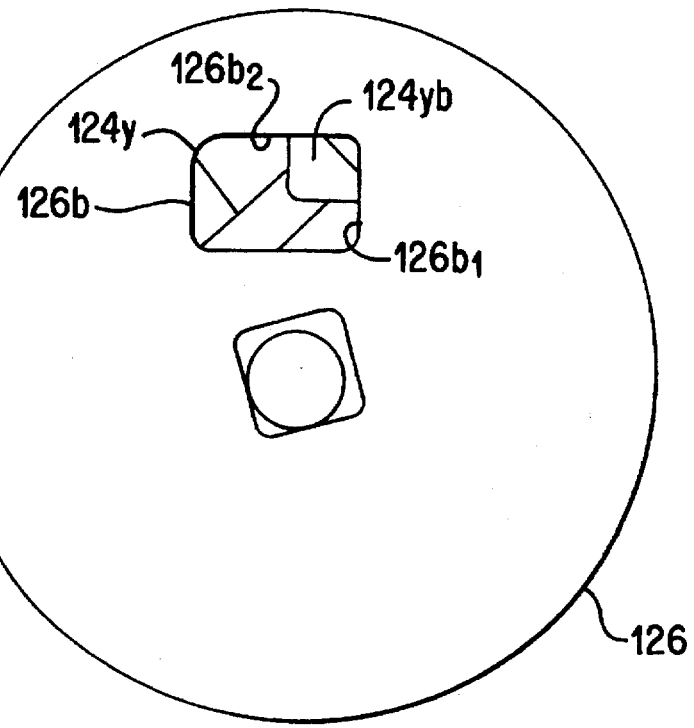
FIG. 9 is a top view of an alternate drive structure with a disk hub placed thereon.

As in FIG. 5, FIG. 9 is a diagram in which the disk hub 126, fastened to the center of the recording medium, is mounted on the chucking mechanism. In this drawing, the shape of the drive pin 124yb of the chucking lever 124y is configured to be different from that shown in FIG. 5. The drive pin 124yb is configured to possess only the areas for contacting surfaces 126b1 and 126b2 of the drive hole 126b provided in the media hub 126 (rather than being round as in FIG. 5). Unlike the previous embodiments, in which the drive pin contacted the drive hole at two points, with the FIG. 9 arrangement, the drive pin contacts the drive hole along two lines. Even when the drive pin 124yb is shaped in this way, it is still possible to obtain the same effect as with the drive pin 124b shown in FIG. 5. It also is possible to shape the perimeter of the drive pin so that it contacts the drive hole at one point and along one line.

Figure 10:
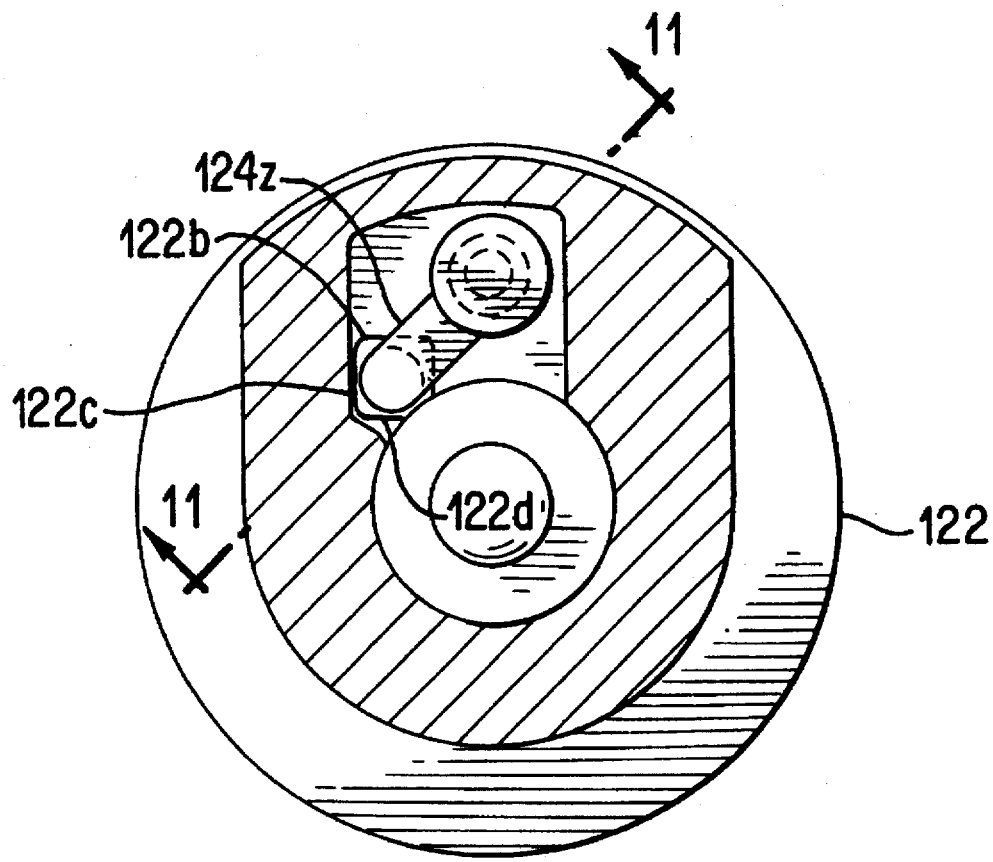
FIG. 10 is a top view of the disk chucking mechanism of an embodiment of the invention.
Figure 11:
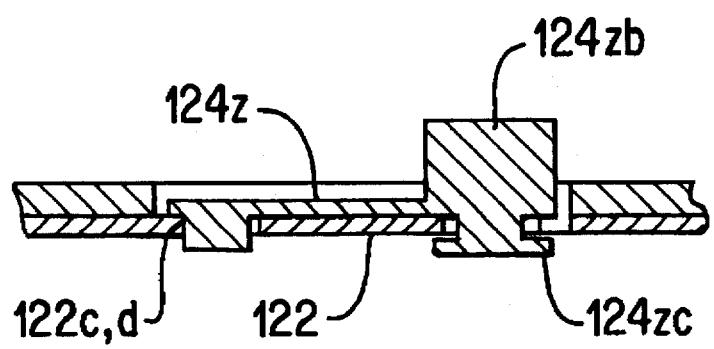
FIG. 11 is a cross-section along line 11—11 of FIG. 10.

FIG. 10 shows yet another working example of the invention, and is a top view of a disk chucking mechanism. FIG. 11 is a cross-section along line 11—11 of the disk chucking mechanism in FIG. 10.

With this structure, a part of the chucking lever 124z is engaged with a drive pin positioning hole 122b in the rotor 122.

As shown in FIG. 11, the engagement area 124zc has been provided in the lower part of the drive pin 124zb and functions as an anti-disengagement device to prevent the chucking lever 124x and the rotor 122 from disengaging from each other. The movement of the chucking lever 124z in the axial direction of the spindle 120 is restricted by this engagement area 124zc, while the chucking lever 124z is allowed to move for a specified distance in the planar direction of the rotor 122. Thus, the chucking lever 124z is able to position the recording media hub 126, as explained in FIGS. 3 through 5.

In this working example, the position of the chucking lever 124z is determined through its direct engagement with areas 122c and 122d of the metallic rotor 122 (rather than with surfaces 123a1 and 123a2 of the chucking magnet 123 as in FIG. 4). This arrangement is advantageous because the wear in the areas 122c and 122d, which engage with the chucking lever 124z, is smaller than that experienced when the chucking magnet 123 and the chucking levers 124x or 124y engage as described earlier. This difference enhances the durability of the chucking mechanism.

If the rotor 122 is equipped with an index detector (not shown in the drawing) for detecting the revolution of the spindle 120, it is possible to build in very high positional accuracy of the index detector and the drive pin 124zb in the rotational direction. This is made possible because the positions of the index detector and the chucking lever 124z in the rotational direction are determined only by the accuracy of the rotor 122, rather than by plural elements.

Figure 12:
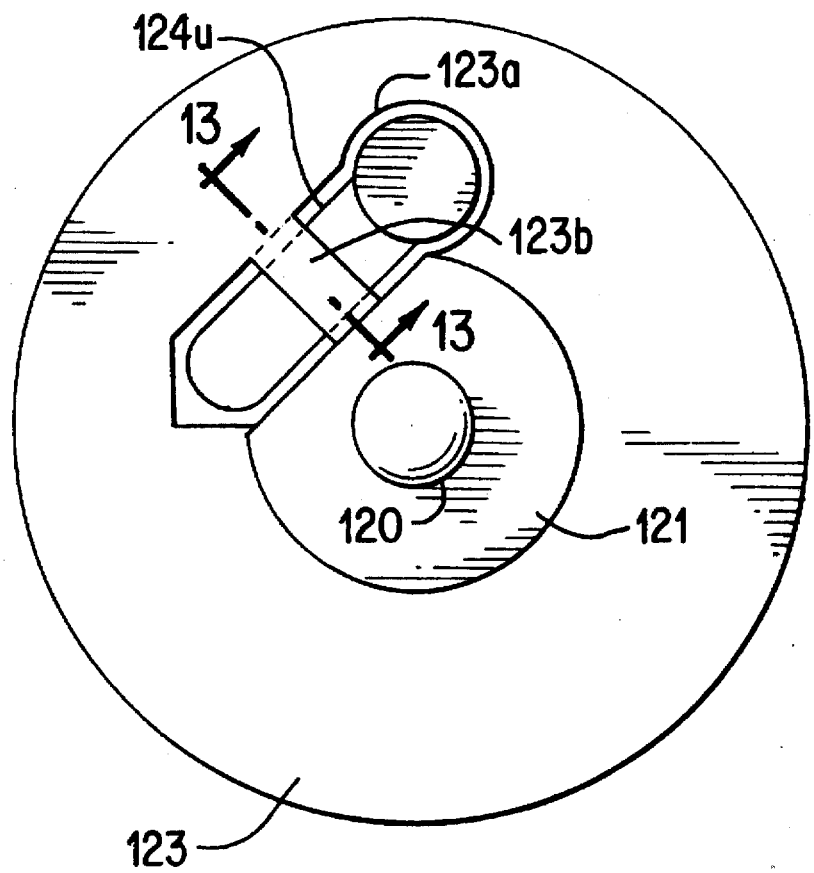
FIG. 12 is a top view of the disk chucking mechanism of an embodiment of the invention.
Figure 13:
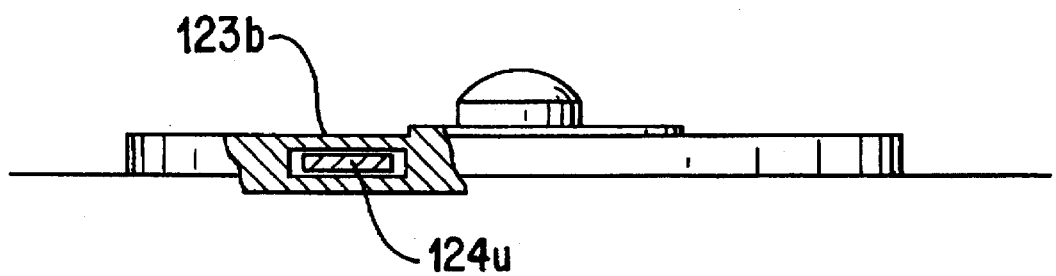
FIG. 13 is a cross-section along line 13—13 of FIG. 12.

FIGS. 12 and 13 show additional working examples of the invention. FIG. 12 is the top view of the disk chucking mechanism, and FIG. 13 is a cross-section along line 13—13 of FIG. 12. In FIG. 12, the platform 121 is fastened to the perimeter of the spindle 120, and the chucking magnet 123 is fastened to the perimeter of the platform 121.

Hole 123a has been provided in the chucking magnet 123, and the chucking lever 124u is installed so that the chucking lever 124u can freely move inside the hole 123a within a specified range in the planar direction of the platform 121. Up to this point, this working example is the same as that shown in FIG. 2. However, a difference exists in that a presser area 123b is provided on top of the chucking lever 124u, to restrict movement of the chucking lever 124u in the axial direction of the spindle 120.

FIG. 13 shows a cross-section along line 13—13 of FIG. 12. The movement of the chucking lever 124u can be restricted, as in earlier working examples, by installing the presser area of the chucking magnet on top of the chucking lever 124u.

These mechanisms for restricting the movement of the chucking lever in the axial direction of the spindle can be installed as a single unit. Naturally, however, installing them in multiple locations or using them by combining some of the working examples described will be even more effective.

Furthermore, as shown in FIG. 8, the edge of the drive pin 124xb, which connects the top surface and the perimeter of the drive pin 124xb, is oriented obliquely relative to the surface of the platform 121 at an angle α. The angle α of this inclining plane is set to be a minimal angle θ illustrated in FIG. 14 formed when the central hole 126a of the disk hub 126 engages with the spindle 120 while the drive pin 124xb and the drive hole 126b of the disk hub 126 are not aligned with each other. Thus, the disk hub 126 rests on the drive pin 124xb in a tilted position. By setting the oblique angle α to be at minimal angle θ, the vertical space requirements of the chucking mechanism are reduced. Preferably, the oblique angle is within +/−2° of this minimal angle.

Figure 14:
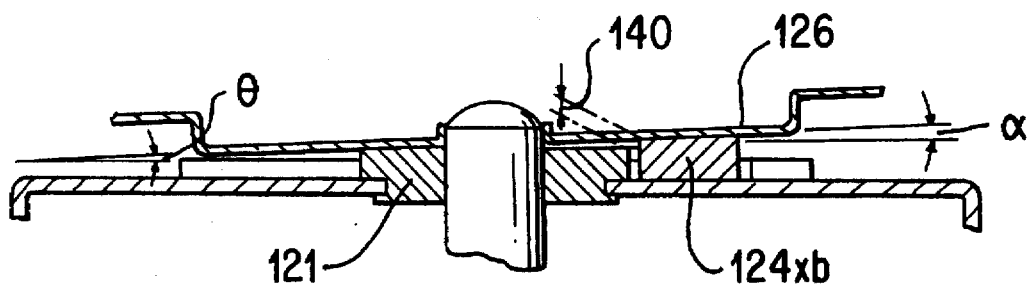
FIG. 14 is a cross-section of the disk chucking mechanism of an embodiment of the invention.
Figure 15:
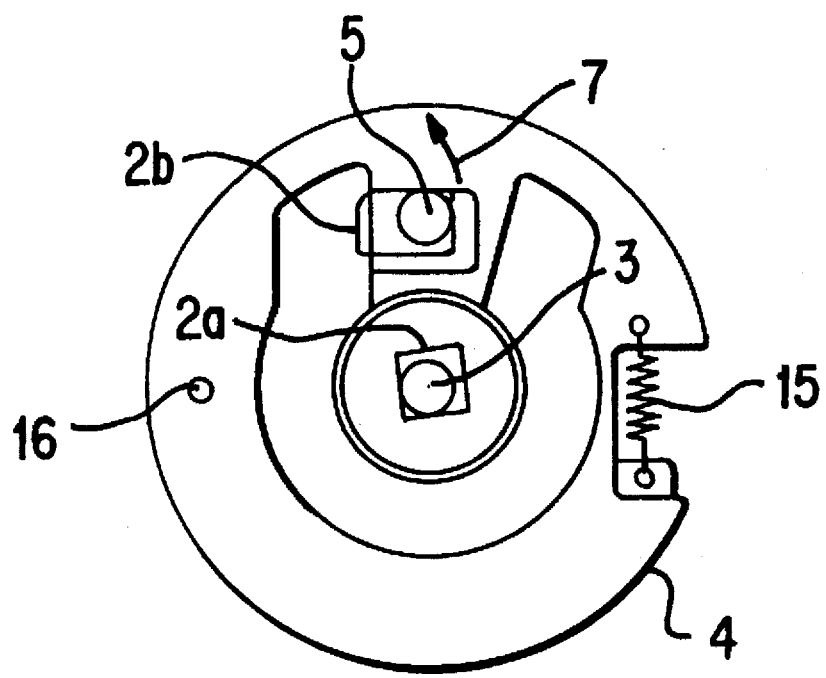
FIG. 15 is a top view of a conventional disk chucking mechanism.
Figure 16:
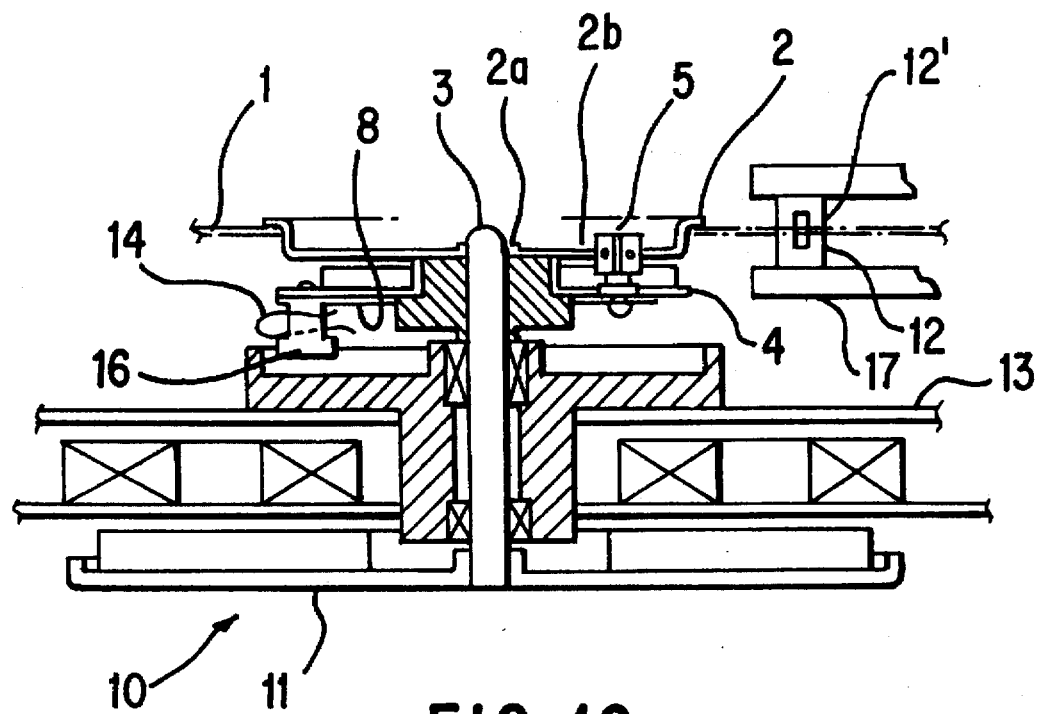
FIG. 16 is a cross-section of the FIG. 15 conventional disk chucking mechanism.
Figure 17:
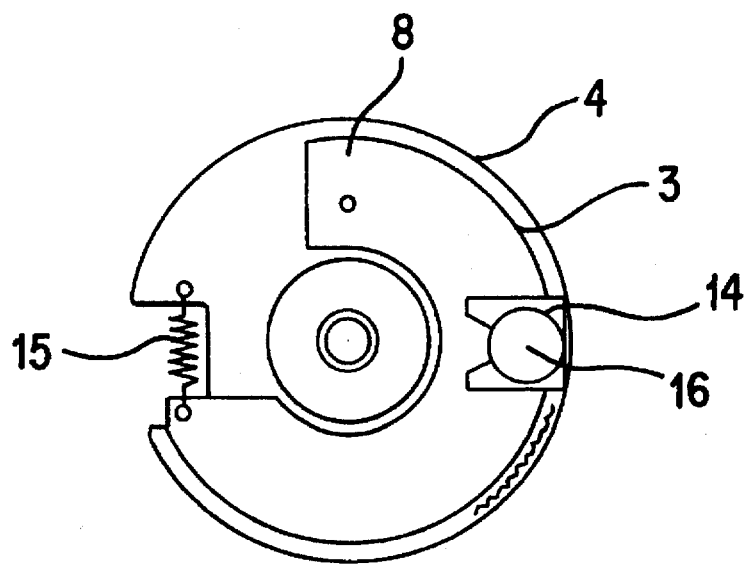
FIG. 17 is a bottom view of the FIG. 15 conventional disk chucking mechanism.
Figure 18:
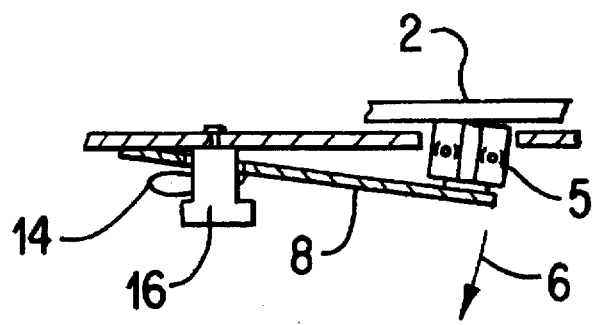
FIG. 18 is a simplified cross-section of a conventional drive pin.
Figure 19:
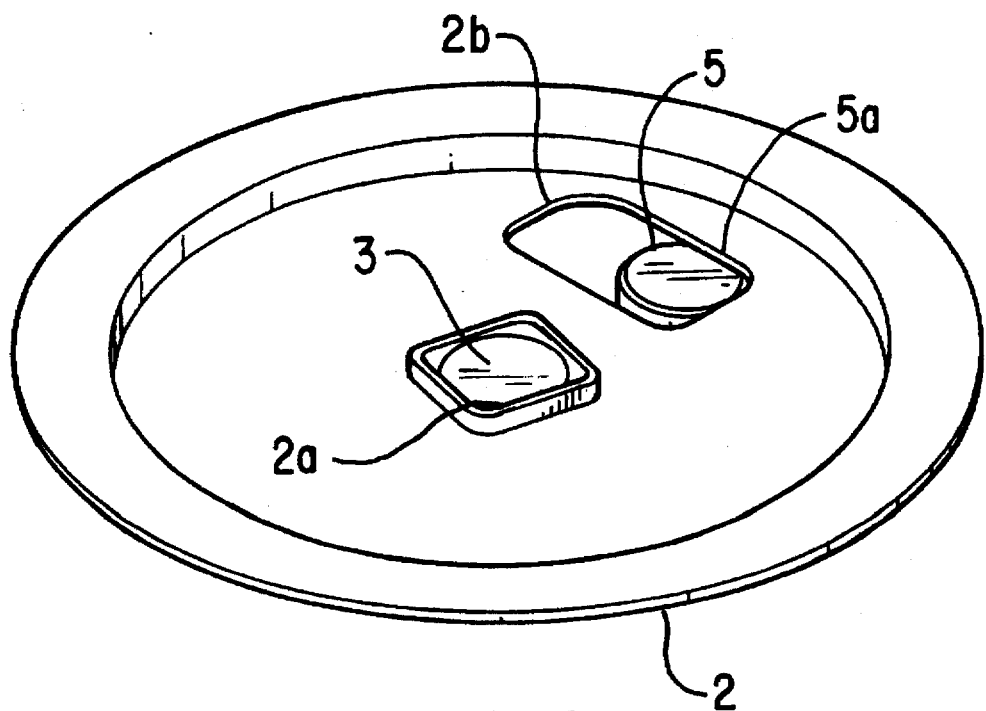
FIG. 19 is an oblique view of a conventional disk chucking mechanism.
Figure 20:
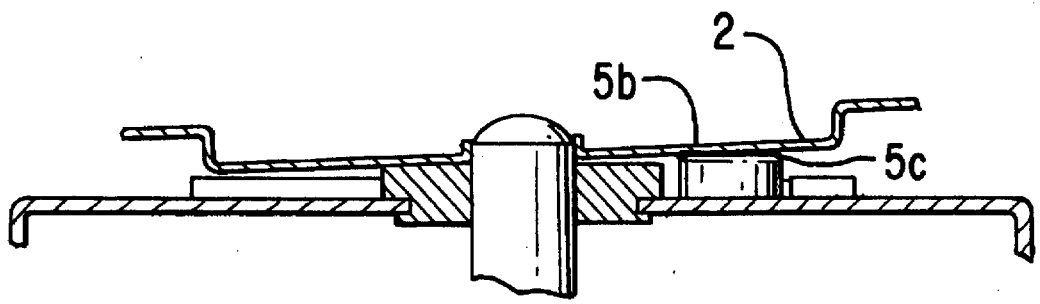
FIG. 20 is a cross-section of the FIG. 19 conventional disk chucking mechanism.
Figure 21:
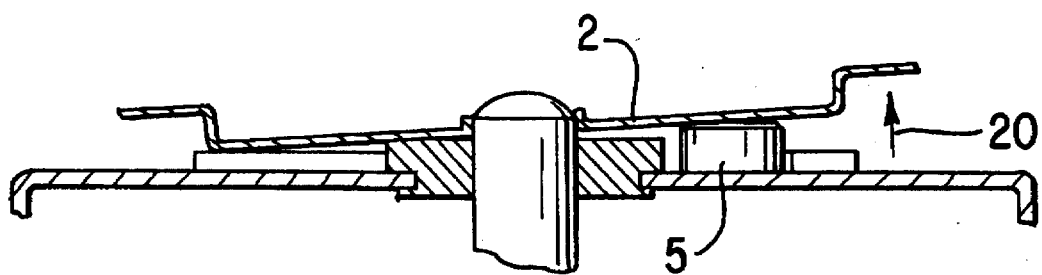
FIG. 21 also is a cross-section of the FIG. 19 conventional disk chucking mechanism.

FIG. 14 is a cross-section of FIG. 8 with the disk hub 126 mounted in such a position. This feature is advantageous because even when the disk hub 126 lies on top of the drive pin 124xb, the disk hub 126 rests on the entire upper surface of the drive pin 124xb, rather than resting on the edge between the top surface and the perimeter of the drive pin. Accordingly, the force applied by the weight of the disk hub 126, the disk, and the surrounding jacket is distributed over the entire upper surface of the drive pin, rather than being concentrated along the edge of the drive pin. This reduces the possibility of the disk hub 126 adhering to the drive pin 124xb when the drive pin 124xb is not aligned with the drive hole 126b.

It is preferable to make the top surface of the drive pin 124xb flat, as shown in FIGS. 8 and 14. Furthermore, even if the center of the drive pin 124xb is made slightly larger (i.e., bulged), forming a convex shape, incomplete latching of the drive hole of the disk hub 126 to the drive pin 124xb will not occur, thus producing a solid chucking device.

Naturally, making the top surface of the drive pin 124xb into a concave shape will still not result in incomplete latching of the disk hub 126 to the drive pin 124xb.

The incline at which the disk hub 126 is mounted in the drive pin 124xb is smallest when the top surface of the drive pin 124xb is flat. When the top surface of the drive pin 124xb is made concave, the incline of the disk hub 126 increases because the disk hub 126 is mounted in this concave area. For this reason, the plane that forms the ridge between the side and the top surfaces of the drive pin 124xb is set so that the top surface of the drive pin 124xb is flat, thus resulting in the smallest incline of the disk hub 126.

Furthermore, by setting the top surface of the drive pin 124xb so that it slopes slightly down toward the direction of the movement of the drive pin 124 (e.g. at point A in FIG. 4) while the disk hub 126 is mounted on the drive pin 124xb, the drive hole 126b of the disk hub 126 will not latch onto the front surface of the drive pin 124xb, thus preventing incomplete chucking. Therefore, the oblique surface at which the outer and top surfaces of the drive pin 124xb meet is set so that it is lower either on the side of the spindle 120, in the advancing direction of the drive pin 124, or between these two positions. In this way, incomplete chucking can be prevented and a good chucking device can be obtained.

It has been empirically proven that the amount by which the highest portion of the drive pin upper surface extends above the lowest portion of the drive pin upper surface should be 0.5 mm or less; otherwise, the drive hole of the disk hub will tend to latch onto the oblique upper surface of the drive pin. Of course, no problem will occur at all if the drive pin upper surface is level.

Furthermore, the amount by which the drive pin 124xb protrudes above the hub platform 121 (dimension 140 in FIG. 14) should be controlled to be 0.7 mm or less. Otherwise, the incline of the disk hub 126 will increase when the disk hub 126 sits on the top surface of the drive pin 124xb, resulting in a situation in which the jacket (not shown in the drawing) presses hard on the disk hub 126, increasing the frictional force in this area. This will result in insufficient rotational torque of the spindle motor, making it impossible to drive and rotate the disk hub 126, as explained earlier. To reduce this frictional force between the disk hub 126 and the jacket, careful attention must be paid to the combined total of the amount by which the drive pin 124xb protrudes above the platform 121 (dimension 140) and the difference between the highest and lowest portions of the drive pin upper surface.

As explained above, with the disk chucking mechanism of the invention, the spatial requirement of the motor can be reduced by restricting the movement of the chucking lever, which is installed on the rotating plate (e.g., the motor rotor) attached to the spindle, in the axial direction. Furthermore, the chucking mechanism can be configured using a single-piece chucking lever by providing an anti-disengagement device in the rotational support area of the chucking lever, thus reducing the number of components, improving assembly efficiency, and achieving small size and thin profile for the motor. These improvements ultimately result in a great benefit in terms of achieving ultra-small size and ultra-thin profile for the disk drive. The shape of the drive pin is an important element in configuring a chucking device that can offer this benefit.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A disk chucking mechanism for rotating a disk having a disk hub with a central hole and a drive hole offset from the central hole, said disk chucking mechanism comprising:

a rotatable spindle inserted into said central hole of said disk hub, said rotatable spindle extending in an axial direction;

a rotatable member attached to said spindle for rotation with said spindle, said rotating member extending in a plane substantially perpendicular to said axial direction and including a positioning opening; and an elongated chucking lever located entirely within said positioning opening and including:

a first chucking lever end and a second chucking lever end, said chucking lever being freely movable in two degrees of freedom including translational and rotational directions in said plane within a specified range controlled by said positioning opening, said positioning opening defining at least one precisely located positioning surface which contacts said second chucking lever end during rotation of the rotating member;

a drive pin located at said first chucking lever end, said drive pin having a first end inserted into said drive hole, and a second end located opposite from said first end, being engaged with said rotating member;

a movement restriction member located on a surface of said chucking lever opposite said rotating member that restricts movement of the chucking lever in said axial direction so that said chucking lever is not movable in said axial direction; and an anti-disengagement member located on a surface of said chucking lever opposite said rotating member that prevents said chucking lever from disengaging from said rotating member.

2. The disk chucking mechanism of claim 1, wherein said chucking lever is arranged so that when said disk chucking mechanism is engaged with a disk to rotate the disk, an acute angle is formed between a direction in which force is applied to the chucking lever and a line connecting a center of said spindle to a point at which said drive pin contacts the disk hub in a rotational movement direction of the disk.

3. The disk chucking mechanism of claim 2, wherein said rotating member is a chucking magnet for attracting and holding the disk hub.

4. The disk chucking mechanism of claim 2, wherein said rotating member is a rotor of a spindle motor that is coupled to and rotates said spindle.

5. The disk chucking mechanism of claim 1, wherein said drive pin contacts said drive hole at least at one point while rotating the disk.

6. The disk chucking mechanism of claim 5, wherein said drive pin contacts said drive hole at two points while rotating the disk.

7. The disk chucking mechanism of claim 1, wherein said drive pin includes at least one planar contacting surface that contacts said drive hole at least along one planar edge of the drive hole while rotating the disk.

8. The disk chucking mechanism of claim 7, wherein said drive pin includes at least two planar contacting surfaces that contact said drive hole along two planar edges of the drive hole while rotating the disk.

9. The disk chucking mechanism of claim 1, wherein said chucking lever is rotatable in a counter-clockwise direction when viewed from a side of the disk hub that contacts said chucking lever until the central hole of the disk hub reaches a predetermined centering position in relation to said spindle.

10. The disk chucking mechanism of claim 1, wherein said rotating member is a rotor of a spindle motor that is coupled to and rotates said spindle.

11. The disk chucking mechanism of claim 1, wherein said rotating member is a chucking magnet for attracting and holding the disk hub.

12. The disk chucking mechanism of claim 1, wherein said chucking lever is movable within said plane of said rotating member within a range that allows engagement between the drive hole and said drive pin.

13. The disk chucking mechanism of claim 1, wherein said first end of said drive pin includes an engagement surface that extends at an oblique angle relative to said plane of said rotating member, the disk hub resting on said drive pin when said spindle is inserted into the disk hub central hole while said drive pin is not inserted through the disk hub drive hole.

14. The disk chucking mechanism of claim 13, wherein a difference between said oblique surface and said rotatable member in said axial direction is at a minimum at a point on said oblique surface located between a point closest to said spindle and a point facing an advancing direction of said drive pin.

15. The disk chucking mechanism of claim 14, wherein said point where said difference between said oblique surface and said rotatable member in said axial direction is at said minimum is at said point on said oblique surface located closest to said spindle.

16. The disk chucking mechanism of claim 13, further comprising a hub platform on which said disk hub rests when said disk hub is fully engaged by said disk chucking mechanism, and wherein said drive pin extends axially beyond said hub platform by no more than 0.7 mm.

17. The disk chucking mechanism of claim 1, wherein said second end of said drive pin is rotatably attached to said rotating member for rotation in said plane of said rotating member.

18. The disk chucking mechanism of claim 17, wherein said movement restriction member is provided on said second end of said drive pin.

19. The disk chucking mechanism of claim 18, wherein said anti-disengagement member also is provided on said second end of said drive pin.

20. The disk chucking mechanism of claim 17, wherein said anti-disengagement member is provided on said second end of said drive pin.

21. The disk chucking mechanism of claim 1, wherein said rotatable member includes a receiving hole, and said second end of said drive pin is located in said receiving hole and includes a flange located on a side of said rotatable member opposite from end first side of said drive pin, said flange comprising said movement restriction member and said anti-disengagement member.

22. The disk chucking mechanism of claim 1, further comprising:
 a hub platform having an aperture attached to said spindle and having a radially outer edge, said disk hub resting on said hub platform when said disk hub is fully engaged by said disk chucking mechanism; and
 said rotating member is a chucking magnet having a radially inner edge attached to said radially outer edge of said hub platform.

23. A disk chucking mechanism for rotating a disk having a disk hub with a central hole and a drive hole offset from the central hole, said disk chucking mechanism comprising:
 a rotatable spindle inserted into said central hole of said disk hub, said rotatable spindle extending in an axial direction;
 a hub platform attached to said spindle and including a radially outer edge, said hub platform extending in a plane substantially perpendicular to said axial direction;
 a rotating member attached to said radially outer edge of said hub platform and including a positioning opening; and
 an elongated chucking lever located entirely within said positioning opening and including:
 a first chucking lever end and a second chucking lever end, said chucking lever being freely movable in two degrees of freedom including translational and rotational directions in said plane within a specified range controlled by said positioning opening, said positioning opening defining at least one precisely located positioning surface which contacts said second chucking lever end during rotation of the rotating member;
 a drive pin located at said first chucking lever end and having a first end that is insertable into said drive hole, said drive pin including a movement restriction member located on a surface of said chucking lever opposite said hub platform that restricts movement of the drive pin in said axial direction so that said drive pin is not movable in said axial direction;
 said first end of said drive pin having an oblique surface arranged at an oblique angle relative to said plane of said hub platform, and an amount by which said drive pin protrudes axially beyond said hub platform being no more than 0.7 mm.

24. The disk chucking mechanism of claim 23, wherein a difference between said oblique surface and said hub platform in said axial direction is at a minimum at a point on said oblique surface located between a point closest to said spindle to a point located on a drive pin advancement side of said drive pin.

25. The disk chucking mechanism of claim 24, wherein a point where said difference between said oblique surface and said hub platform in said axial direction is at said minimum is at said point on said oblique surface located closest to said spindle.

26. The disk chucking lever of claim 23, wherein said oblique angle of said oblique surface is approximately equal to an angle formed between a plane including the surface of said hub platform and a plane including the surface of the disk hub when the disk hub is placed on said hub platform with said spindle located in said central hole and with said disk hub resting on said drive pin first end while said drive pin is not inserted into the drive hole.

27. The disk chucking mechanism of claim 26, wherein said oblique angle is within +/−2 degrees of said angle formed between the plane including the surface of the hub platform and the plane including the surface of the disk hub.

28. The disk chucking mechanism of claim 23, wherein said oblique surface is flat.

29. The disk chucking mechanism of claim 23, wherein said chucking lever is movable by a predetermined amount in said plane of said rotating member.

30. A disk chucking mechanism for rotating a disk having a disk hub with a central hole and a drive hole offset from the central hole, said disk chucking mechanism comprising:
 a rotatable spindle inserted into said central hole of said disk hub, said rotatable spindle extending in an axial direction;
 a hub platform having an aperture attached to said spindle and having a radially outer edge, said hub platform extending in a plane substantially perpendicular to said axial direction;
 a chucking magnet having a radially inner edge attached to said radially outer edge of said hub platform, and having a positioning opening between a radially outer edge of said chucking magnet and said radially inner edge of said chucking magnet;
 a chucking lever inserted to be entirely within and freely movable in two degrees of freedom including translational and rotational directions in said chucking magnet positioning opening, said positioning opening defining a specified range by which said chucking lever is movable in said plane of said hub platform, a first end of said chucking lever including a drive pin having a first end inserted into said drive hole, a second end of said chucking lever opposite from said first end including a movement restriction member that restricts movement of the chucking lever in said axial direction so that said chucking lever is not movable in said axial direction, said positioning opening defining at least one precisely located positioning surface which contacts said second end of said chucking lever during rotation of the chucking magnet.

31. The disk chucking mechanism of claim 30, further comprising a rotating member attached to said spindle for rotation with said spindle, said rotating member extending in said plane substantially perpendicular to said axial direction, said movement restriction member being engaged with said rotating member.

32. The disk chucking mechanism of claim 31, wherein said rotating member is a rotor of a spindle motor that is coupled to and rotates said spindle.

33. The disk chucking mechanism of claim 31, wherein said rotatable member includes a receiving hole, and said second end of said drive pin is located in said receiving hole and includes a flange located on a side of said rotatable member opposite from said first end of said drive pin, said flange comprising said movement restriction member.

34. The disk chucking mechanism of claim 30, wherein said chucking lever is movable within said plane of said rotating member within a range that ensures engagement between the drive hole and said drive pin.

35. The disk chucking mechanism of claim 30, wherein said first end of said drive pin includes an engagement surface that extends at an oblique angle relative to said plane of said hub platform, the disk hub resting on said oblique surface when said spindle is inserted into the disk hub central hole while said drive pin is not inserted through the disk hub drive hole.

36. The disk chucking mechanism of claim 35, wherein a difference between said oblique surface and said hub platform in said axial direction is at a minimum at a point on said oblique surface located between a point closest to said spindle and a point located on a drive pin advancement side of said drive pin.

37. The disk chucking mechanism of claim 36, wherein a point where said difference between said oblique surface and said hub platform in said axial direction is at said minimum is at said point on said oblique surface located closest to said spindle.

38. The disk chucking mechanism of claim 35, wherein said drive pin extends axially beyond said hub platform by no more than 0.7 mm.

39. A disk chucking mechanism for rotating a disk having a disk hub with a central hole and a drive hole offset from the central hole, said disk chucking mechanism comprising:

a rotatable spindle inserted into said central hole of said disk hub, said rotatable spindle extending in an axial direction;

a hub platform having an aperture attached to said spindle and having a radially outer edge, said disk hub resting on said hub platform when said disk hub is fully engaged by said disk chucking mechanism;

a chucking magnet having a radially inner edge attached to said radially outer edge of said hub platform, said chucking magnet extending in a plane substantially perpendicular to said axial direction and including a positioning opening; and an elongated chucking lever located entirely within said positioning opening and including:

a first chucking lever end and a second chucking lever end, said chucking lever being freely movable in two degrees of freedom including translational and rotational directions in said plane within a specified range controlled by raid positioning opening, said positioning opening including at least one precisely located positioning surface which contacts said second chucking lever end during rotation of the chucking magnet;

a drive pin located at said first chucking lever end having a first end inserted into said drive hole, a second end of said drive pin, located opposite from said first end, being engaged with said rotating member;

a movement restriction member located between said first chucking lever end and said second chucking lever end that restricts movement of the chucking lever in said axial direction so that said chucking lever is not movable in said axial direction; and an anti-disengagement member located on a surface of said chucking lever opposite said rotating member that prevents said chucking lever from disengaging from said rotating member.

* * * * *